United States Patent [19]

Fujiwara et al.

[11] Patent Number: 5,480,013

[45] Date of Patent: Jan. 2, 1996

[54] ONE-WAY CLUTCH INCORPORATING A RETAINER HAVING PAIRED SYMMETRIC ENGAGEMENT PORTIONS

[75] Inventors: Satoshi Fujiwara, Kashiwara; Takaaki Ikeda, Nara, both of Japan

[73] Assignee: Koyo Seiko Co., Ltd., Osaka, Japan

[21] Appl. No.: 274,445

[22] Filed: Jul. 13, 1994

[30] Foreign Application Priority Data

Aug. 31, 1993 [JP] Japan .................................. 5-216385

[51] Int. Cl.⁶ .................................................. F16D 41/07
[52] U.S. Cl. ........................................ 192/45.1; 192/41 A
[58] Field of Search .................................. 192/41 A, 45.1

[56] References Cited

U.S. PATENT DOCUMENTS

| | | | |
|---|---|---|---|
| 2,832,450 | 4/1958 | Wade | 192/45.1 |
| 2,856,045 | 10/1958 | Ferris | 192/45.1 |
| 4,635,770 | 1/1987 | Shoji et al. | 192/41 A |
| 4,854,435 | 8/1989 | Kitamura et al. | 192/41 A |
| 4,928,801 | 5/1990 | Laurent | 192/45.1 |
| 5,000,303 | 3/1991 | Shoji et al. | 192/45.1 |
| 5,024,308 | 6/1991 | Kinoshita et al. | 192/41 A |
| 5,038,903 | 8/1991 | Akagi et al. | 192/41 A |

FOREIGN PATENT DOCUMENTS

| | | |
|---|---|---|
| 3502882 | 8/1985 | Germany . |
| 3919783 | 12/1989 | Germany . |
| 63-115637 | 7/1988 | Japan . |

Primary Examiner—Richard M. Lorence
Attorney, Agent, or Firm—Wenderoth, Lind & Ponack

[57] ABSTRACT

A one-way clutch has a plurality of engagement members disposed between an inner ring and an outer ring and spaced at regular intervals in a circumferential direction of the one-way clutch, an annular retainer having a cylindrical part with pockets for receiving the engagement members and a flange which is continuous with an axial end of the cylindrical part and protrudes radially outwardly, and an annular spring for urging the engagement members in a direction of engagement with the inner and outer rings. The retainer has at least one pair of engagement portions to be engaged with the outer ring, the paired engagement portions being located substantially symmetrically relative to an axis of the retainer. Each engagement portion is defined between two pockets and between two slits respectively connected to the two pockets and passing through the flange to the outside of the retainer. The flange in each engagement portion has an outer radius larger than that of a portion of the flange other than the engagement portions and larger than a radius of an inner surface of the outer ring.

3 Claims, 6 Drawing Sheets

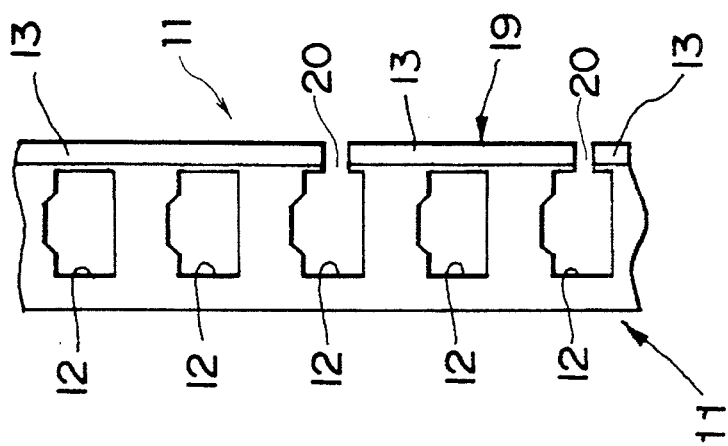
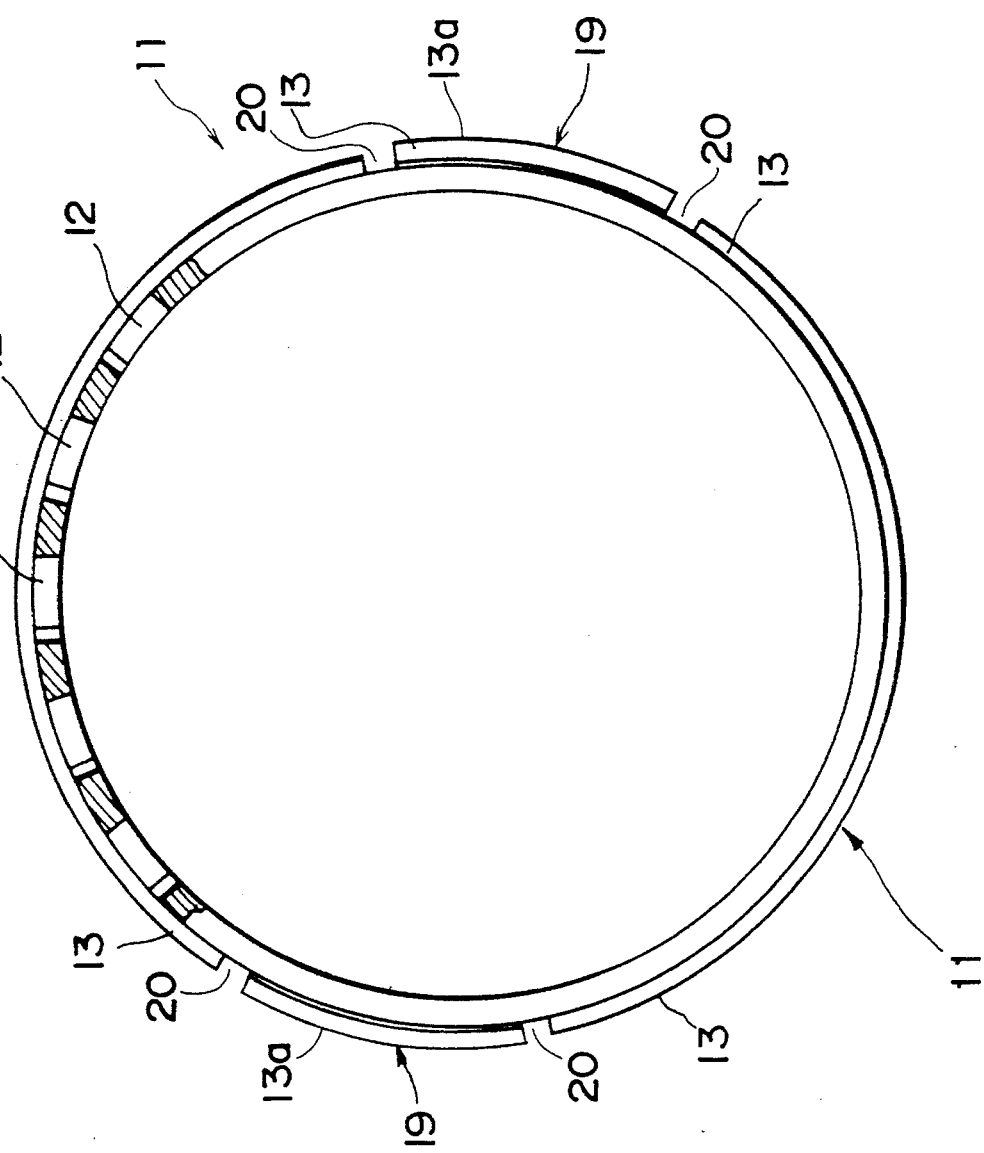

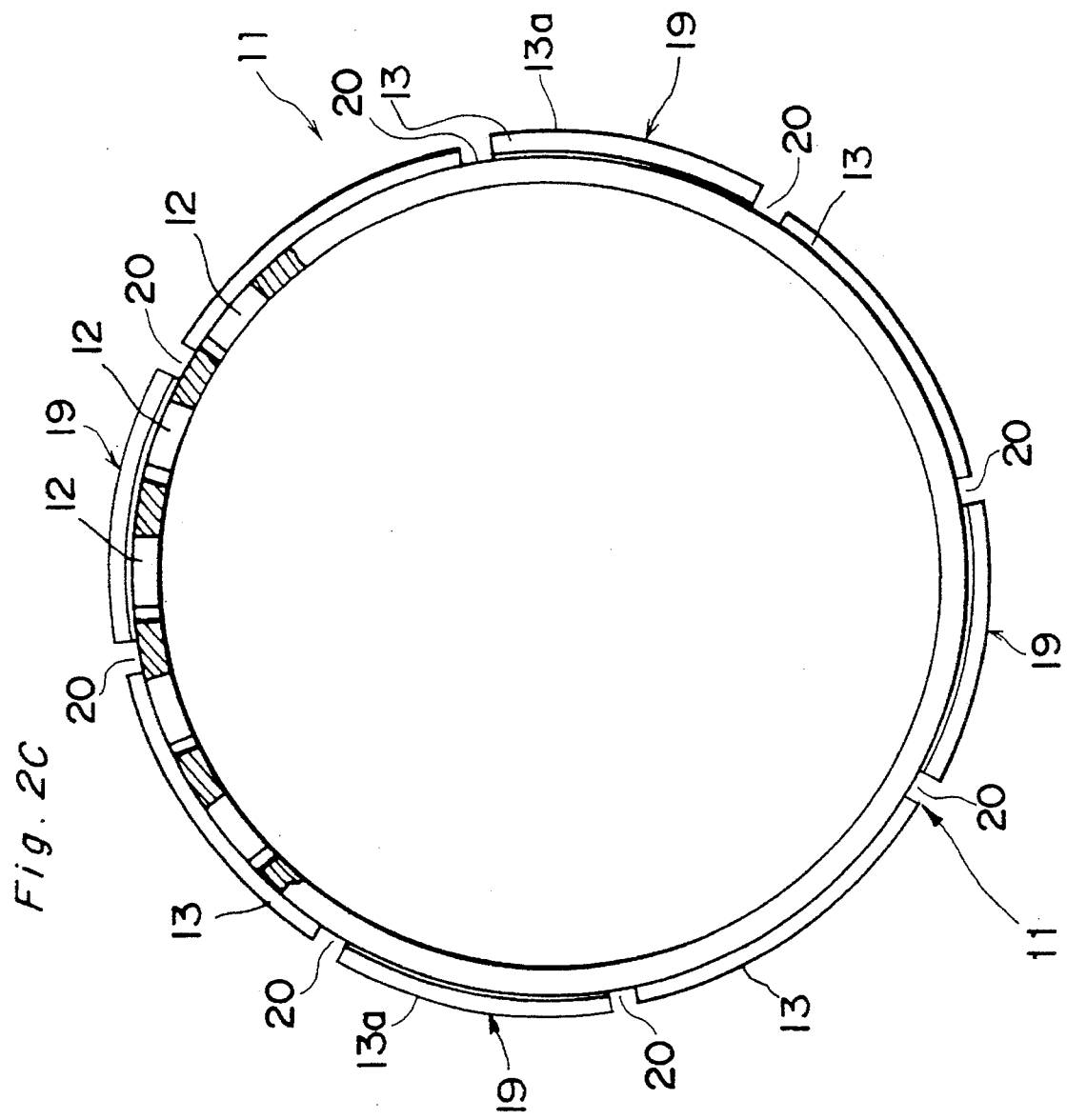

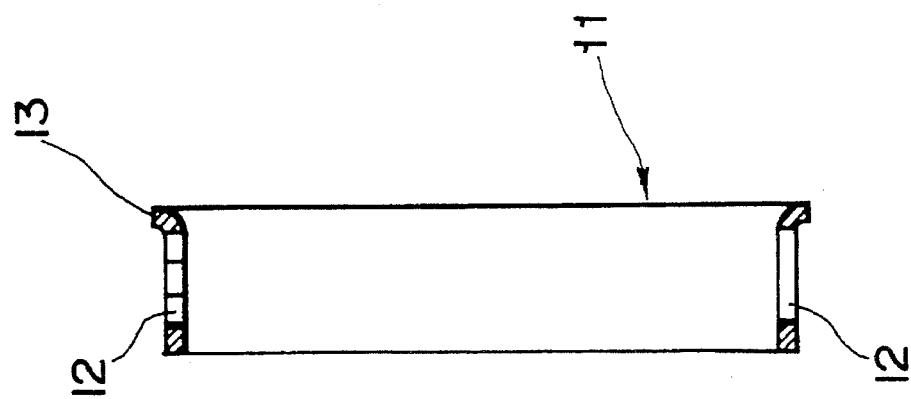
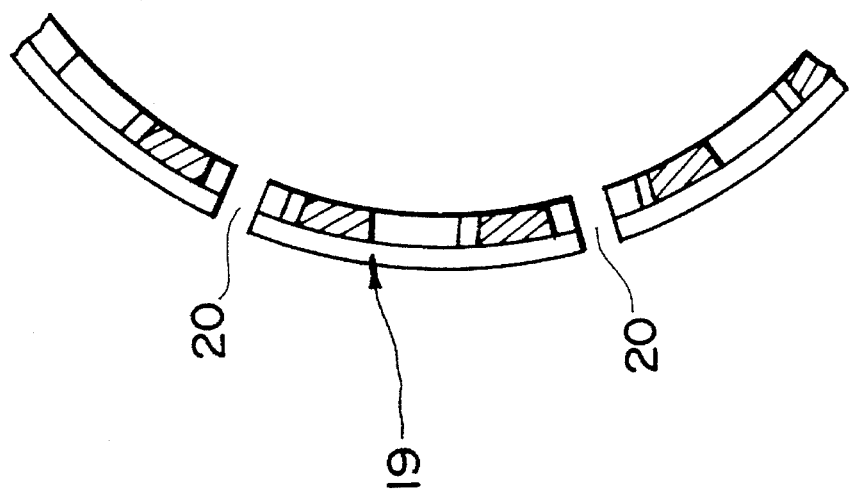

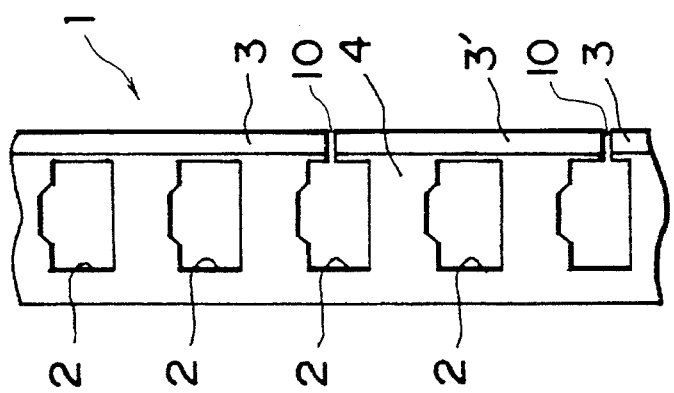
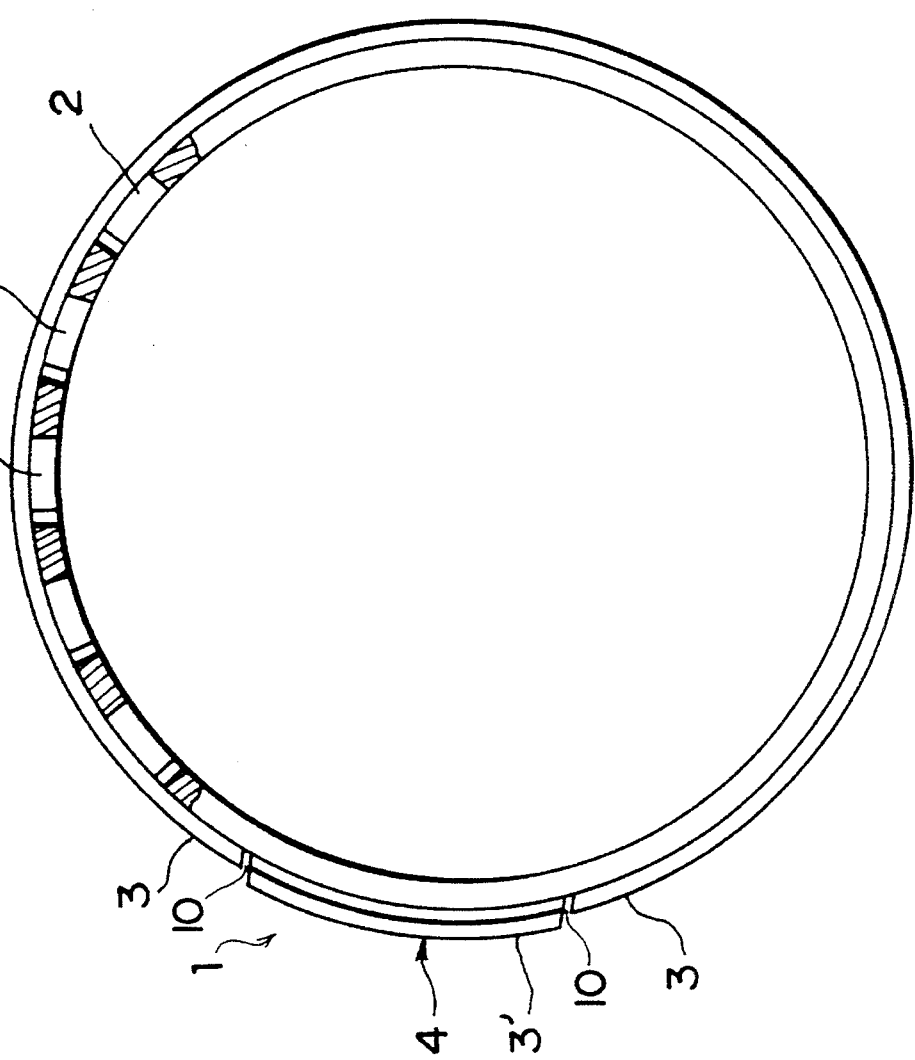

ONE-WAY CLUTCH INCORPORATING A RETAINER HAVING PAIRED SYMMETRIC ENGAGEMENT PORTIONS

BACKGROUND OF THE INVENTION

The present invention relates to one-way clutches for use in starters or speed change gears for automobiles, or the like and more particularly to a retainer for holding engagement members between inner and outer rings.

A conventional one-way clutch is shown in Figs. 5A and 5B. FIGS. 5A and 5B are a front view and a cross sectional view of the one-way clutch, respectively.

As shown in FIGS. 5A and 5B, the one-way clutch has a plurality of sprags 8 serving as engagement members, an inner retainer 5 for retaining radially inner portions of the sprags 8, an outer retainer 1 for retaining radially outer portions of the sprags, and an annular ribbon spring 6 for urging the sprags 8 in one direction. The inner retainer 5, the outer retainer 1 and the ribbon spring 6 have generally rectangular pockets spaced at regular intervals in the circumferential direction for receiving the sprags 8, respectively. The one-way clutch is interposed between an inner ring 9 and an outer ring 7 and transmits a rotating torque from the inner ring 9 to the outer ring 7 through the sprags 8 only when the inner ring 9 rotates in one direction relative to the outer ring 7.

FIG. 4A is a partially cut-away front view of the outer retainer 1 of the one-way clutch and FIG. 4B is a fragmentary side view of the outer retainer 1. As shown in these figures, the pockets 2 of the outer retainer 1 are formed in a cylindrical part of the outer retainer 1. The outer retainer has an outer flange 3 extending radially outwardly from an axial end of the cylindrical part.

In the outer retainer 1, two slits 10 are provided. The slits 10 are connected with pockets 2 respectively and pass through the flange 3 to the outside of the outer retainer 1 such that a portion having a shape generally like that of two side-by-side and connected to (referred to as "connected-T bar" below) 4 is formed. The connected-T bar 4 protrudes radially outwardly, so that the distance between the center of the flange 3 and a radially outer surface of a flange portion 3' of the connected-T bar 4 is larger than a radius of an inner surface of the outer ring 7 where the outer retainer 1 is fitted. By an elastic force of the connected-T bar 4 which occurs when the outer retainer 1 is placed in position inside the outer ring 7, the radially outer surface of the flange portion 3' of the connected-T bar 4 is pressed against the inner surface of the outer ring 7, whereby the outer retainer 1 is fixed to the outer ring 7.

In the above-described conventional one-way clutch, however, the distance from the center of the outer flange 3 to the radially outer surface of the flange portion 3' of the connected-T bar 4 is made larger than the radius of the inner surface of the outer ring 7. Therefore, when the outer retainer 1 is placed in the outer ring 7, as shown in FIG. 5B, a counterforce or reaction force of the force of the connected-T bar 4 pushing the outer ring 7 acts on the flange portion 3. Therefore, the outer retainer 1 is caused to be displaced by the counterforce from a position 1' shown by a dotted line toward the direction opposite to the connected-T bar and the outer retainer 7 is made eccentric from the outer ring 7. As a result, some pockets 2 of the outer retainer 1 on the opposite side from the connected-T bar 4 are displaced from their normal positions relative to the sprags 8 and get located at radially outer wide portions of the sprags 8.

Accordingly, there is a problem that the circumferential clearance between those displaced pockets 2 located on the opposite side from the connected-T bar 4 and the sprags 8 received in those pockets 2 is reduced and that motions of those sprags 8 are suppressed more than necessary.

The conventional one-way clutch has a further problem that it takes a long time to process the slits 10 to produce the connected-T bar 4. This is because the slits 10 can be worked only by a grinder for the reason that portions of the flange 3 to be cut out are located only on one side in the diametrical direction and that press-cutting would cause a large imbalance of force.

SUMMARY OF THE INVENTION

An object of the present invention is therefore to provide a one-way clutch having a retainer which is prevented from becoming eccentric relative to an outer ring, when placed in position to be engaged with the outer ring, so that the motions of engagement members retained by the retainer are not suppressed more than necessary, and which can be produced in a reduced time.

In order to achieve the aforementioned object, the present invention provides a one-way clutch comprising a plurality of engagement members disposed between an inner ring and an outer ring and spaced at regular intervals in a circumferential direction of the one-way clutch, an annular retainer having a cylindrical part with pockets for receiving the engagement members and a flange which is continuous with an axial end of the cylindrical part and protrudes radially outwardly, and an annular spring for urging the engagement members in a direction of engagement with the inner and outer rings. The retainer has at least one pair of engagement portions to be engaged with the outer ring, wherein the at least one pair of engagement portions are located substantially symmetrically relative to an axis of the retainer. Each engagement portion is defined between two pockets and between two slits respectively connected to the two pockets and passing through the flange to the outside of the retainer. The flange in each engagement portion has an outer radius larger than that of a portion of the flange other than the engagement portions and larger than a radius of an inner surface of the outer ring.

For example, in an embodiment, the retainer may have a single pair of engagement portions which are spaced from each other by substantially 180° around the axis of the retainer.

Alternatively, the retainer may have two pairs of engagement portions which are spaced from each other by substantially 90° around the axis of the retainer.

When the outer retainer is inserted in the outer ring, the engagement portions of the retainer are brought into contact with the inner surface of the outer ring whereby the retainer is engaged with the outer ring. At this time, because the engagement portions of the retainer are placed substantially symmetrically relative to the axis of the retainer, that is, in diametrically opposite positions rekative to each other, counterforces that the paired engagement portions of the retainer receive from the outer ring cancel out. Accordingly, the retainer is prevented from being displaced and it is therefore kept coaxial with the outer ring, so that the circumferential clearance between the pockets and the engagement members such as sprags is ensured and the motions of the engagement members are not suppressed excessively by the retainer.

Since the engagement portions of the retainer are placed in the substantially symmetric positions relative to the axis of the retainer, the slits defining the engagement portions can be press-cut at the same time without warping the retainer due to equal forces being exerted on the retainer.

BRIEF DESCRIPTION OF THE DRAWINGS

The present invention will become more fully understood from the detailed description given hereinbelow and the accompanying drawings which are given by way of illustration only, and thus are not limiting of the present invention, and wherein:

FIG. 2A is a partially cut-away front view of an outer retainer used in the one-way clutch according to the present invention;

FIG. 2B is a fragmentary side view of the outer retainer of FIG. 2A;

FIG. 2C is a partially cut-away front view of a variant of the outer retainer of FIG. 2A;

FIG. 3A is a fragmentary sectional view of the outer retainer, viewed in the axial direction of the outer retainer;

FIG. 3B is a sectional view of the outer retainer, viewed in a direction perpendicular to the axis of the outer retainer;

FIG. 4A is a partially cut-away front view of an outer retainer of a conventional one-way clutch;

FIG. 4B is a fragmentary side view of the outer retainer of FIG. 4A;

DETAILED DESCRIPTION OF THE PREFERRED EMBODIMENTS

Figure 1B:
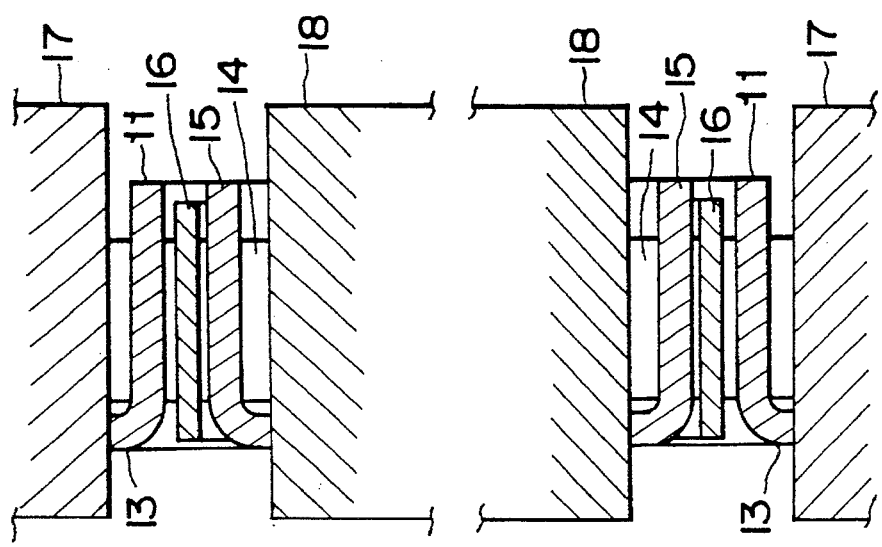
FIG. 1B is a sectional view of the one-way clutch of FIG. 1A in a state fitted between an inner ring and an outer ring, viewed in a direction perpendicular to the axis of the one-way clutch.
Figure 1A:
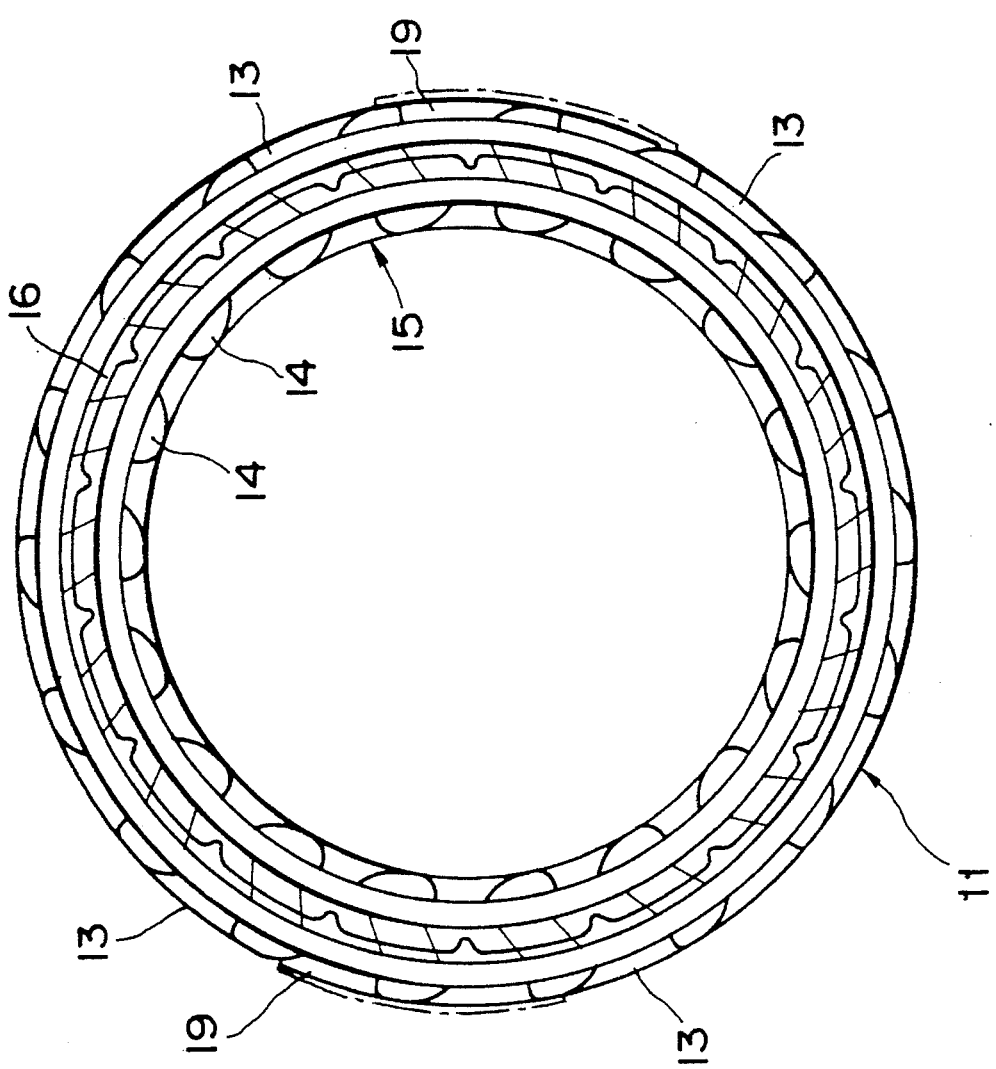
FIG. 1A is a front view of a one-way clutch according to an embodiment of the present invention.
Figure 5B:
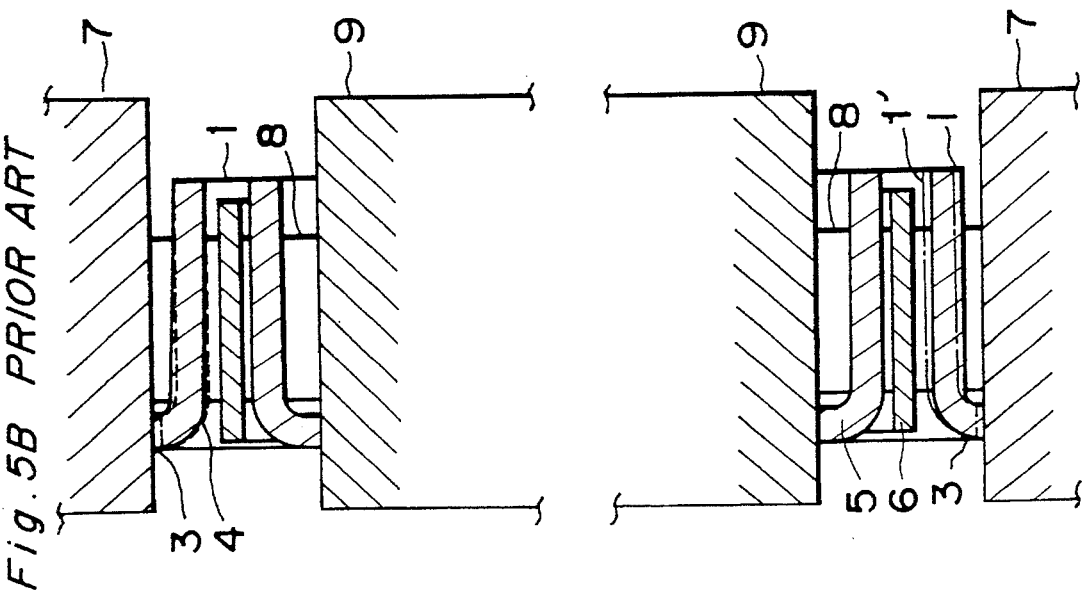
FIG. 5B is a sectional view of the conventional one-way clutch of FIG. 4A fitted between an outer ring and an inner ring.
Figure 5A:
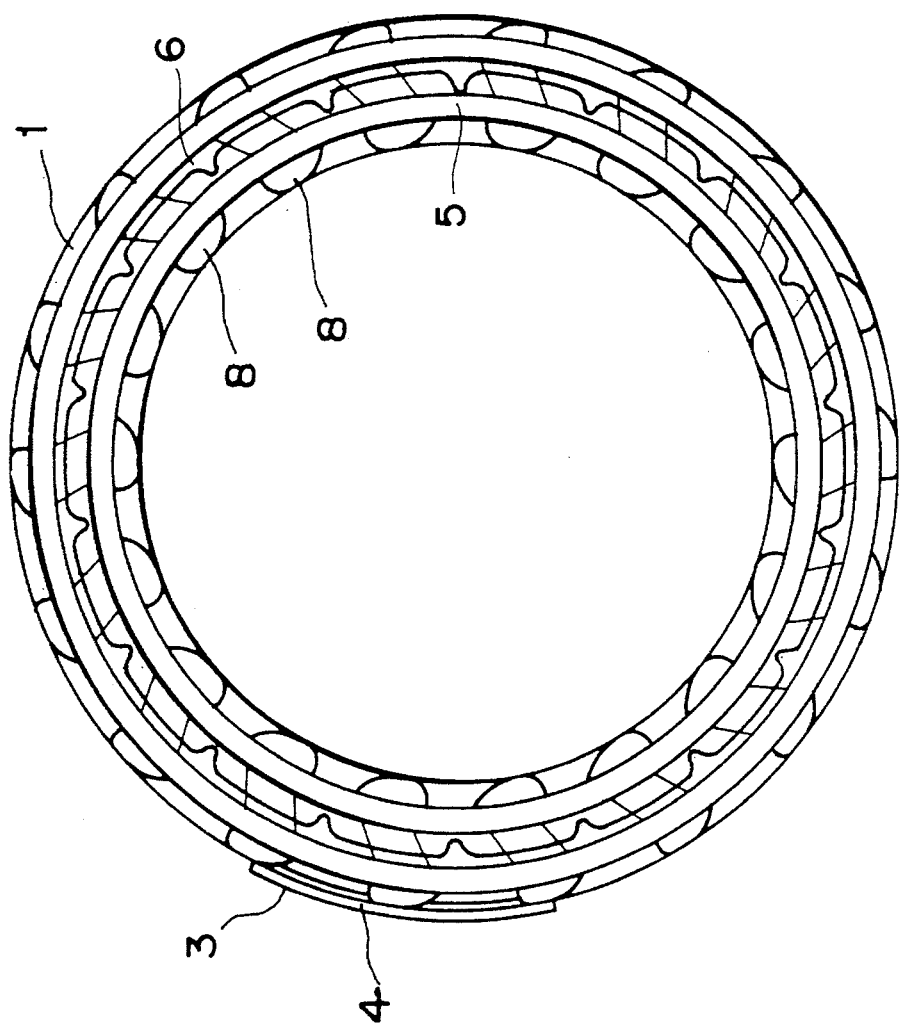
FIG. 5A is a front view of a conventional one-way clutch incorporating the outer retainer of FIG. 4A.

FIGS. 1A and 1B show a one-way clutch according to an embodiment of the present invention, and FIGS. 2A and 2B show an outer retainer incorporated in the one-way clutch.

As shown in FIGS. 1A and 1B, the one-way clutch has a plurality of sprags 14 serving as engagement members, an inner retainer 15 for retaining radially inner portions of the sprags 14, an outer retainer 11 for retaining radially outer portions of the sprags 14, and an annular ribbon spring 16 for urging the sprags 14 in an engaging direction (clockwise in this embodiment). The inner retainer 15, the outer retainer 11 and the ribbon spring 16 have respective cylindrical parts where generally rectangular pockets are provided spaced at regular intervals in the circumferential direction for receiving the sprags 14.

The one-way clutch is interposed between an inner ring 18 and an outer ring 17. Wedging action of the sprags 14 tilting clockwise, when the inner ring rotates counterclockwise, locks the inner and outer rings 18 and 17, allowing the rotating torque of the inner ring to be transmitted to the outer ring. On the other hand, the tilting of the sprags 14 toward an idling side (counterclockwise), when the inner ring rotates clockwise, causes the inner ring 18 to idle.

The outer retainer 11 has an outer flange 13 being continuous with an axial end of the cylindrical part of the outer retainer 11 and extending radially outwardly from the axial end of the cylindrical part. The flange 13 is formed by radially outwardly bending an end portion of the outer retainer 11 by a predetermined amount.

As shown in FIG. 2B, the outer retainer 11 has slits 20 connected to two pockets 12 and passing through the flange 13 to the outside of the outer retainer 11. Between the two pockets 12 is interposed one pocket 12.

An engagement portion 19 defined between the two pockets 12 and the two slits 20 and having a shape of generally connected T's (the engagement portion will be referred to as a connected-T bar hereinbelow) protrudes slightly radially outwardly, as shown in FIG. 2A. Thus, a distance from the center of the flange 13 to a radially outer surface 13a of the flange 13 in the connected-T bar 19 becomes larger than a radius of the inner surface of the outer ring 17.

Another connected-T bar 19 of substantially the same shape as that of the above connected-T bar 19 is formed at an approx. 180° phase-shifted opposite site, as shown in FIG. 2A. That is, two connected-T bars 19 are provided substantially symmetrically relative to the axis of the outer retainer 11.

The flange in each connected-T bar 19 has an outer radius larger than that of a portion of the flange other than the connected-T bars 19 and larger than the radius of an inner surface of the outer ring.

The operations for cutting out of parts of the flange 13, i.e., slits 20, to form the two connected-T bars 19 and protruding of the connected-T bars 19 radially outwardly are done at the same time through a the pressing process. In this case the processing forces exerted on the outer retainer 11 are balanced and deformation of the outer retainer 11 hardly occurs because the pressing is performed at opposite positions of the outer retainer 11.

There are two methods for press-cutting the slits 20. One is to cut the slits 20 in the radial direction such that the spacing between opposite end surfaces of each slit becomes smaller in a radially inner portion than in a radially outer portion, and the other is to cut the slits 20 such that the opposite end surfaces of each slit are parallel. From the point of view that each pocket 12 connected to the slit 20 should have as large a surface area for axially holding or stopping a sprag as possible, it is better to cut out the slits 20 in the radial direction.

A fragmentary sectional view of the connected-T bar 19 and its vicinity, taken along a plane extending in the radial direction, is shown in FIG. 3A. And a sectional view of the outer retainer 11 taken along a plane extending in the axial direction is shown in FIG. 3B.

The two opposite connected-T bars 19, 19 push the inner surface of the outer ring 17 in opposite radial directions and engage the outer retainer 11 with the outer ring 17.

When the one-way clutch of this embodiment is interposed between the outer ring 17 and the inner ring 18, as shown in FIG. 1B, the radially outer surfaces 13a of the flange portions 13 of the opposite connected-T bars 19 are pushed against the inner surface of the outer ring 17 by the elastic forces of the flange portions 13 of the connected-T bars 19 and the outer retainer 11 is fixed to the outer ring 17 because the outer radius of the flange portion 13 included in each of the two connected-T bars 19 is larger than the radius of the inner surface of the outer ring 17, as described before.

In this case, since two connected-T bars 19 are formed in substantially opposite positions, with their phases shifted from each other around the center axis by approx. 180°, two reaction forces which the two connecting T-bars 19 of the outer retainer 11 receive from the outer ring 17 cancel out. As a result, the outer retainer 11 is prevented from being displaced and is kept coaxial with the outer ring 17. Accordingly, the circumferential clearances between the sprags 14 and edges of all the pockets 12 of the outer retainer 11 are constant and circumferential motions of specific sprags 14 are suppressed extraordinarily.

Furthermore, as mentioned above, because the pair of connected-T bars 19 of the retainer 11 are shifted in phase by approx. 180° around the axis from each other so as to be located substantially symmetrically relative to the axis of the outer retainer 11, the slits 20 necessary for formation of the connected-T bars 19 can be press-cut at the same time with equal cutting forces, without causing distortion in the outer retainer 11.

In general, the pockets 12 and other parts of the outer retainer 11 are produced by the pressing process. Therefore, according to this embodiment, the whole outer retainer 11 can be produced by a series of steps of the pressing process, so that the processing time of the outer retainer 11 is shortened very much as compared to the prior art which needs a grinding process.

In the above-described embodiment, two connected-T bars 19, 19 are provided at the opposite positions shifted in phase 180° around the axis of the outer retainer 11, but another two connected-T bars may be formed in the positions shifted in phase from the above-described two connected-T bars 19 by 90° respectively such that these four connected-T bars are arranged like a cross, as shown in FIG. 2C. Other arrangements of the paired connected-T bars are of course possible. What is essential is that the paired connected-T bars are provided substantially symmetrically relative to the axis of the retainer such that forces exerted on the retainer are cancelled.

In the above-described embodiment, the present invention is applied to the one-way clutch which comprises two retainers. However, this invention can be applied not only to the one-way clutch which comprises two retainers but also to the one-way clutch which comprises a single retainer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-way clutch for use between an inner ring and an outer ring disposed about said inner ring, said one-way clutch comprising:

an annular retainer adapted to be mounted between the inner ring and the outer ring, said annular retainer including a cylindrical part and a generally annular flange extending radially outwardly from one axial end of said cylindrical part;

a plurality of engagement members disposed between the inner ring and the outer ring and spaced apart at equal intervals in a circumferential direction of said annular retainer, said cylindrical part having pockets formed therein, and said engagement members being respectively received in said pockets of said cylindrical part of said annular retainer;

an annular spring operably engaged with said engagement members and urging said engaging members to rotate in a given direction which will cause said engagement members to engage with the inner and outer rings when said annular retainer is mounted between the inner ring and the outer ring;

wherein said annular retainer further includes at least one pair of outer ring-engagement portions adapted to engage with an inner surface of the outer ring to fix said annular retainer to the outer ring, said outer ring-engagement portions being disposed at symmetrical positions of said annular retainer with respect to a central axis of said annular retainer;

wherein each of said outer ring-engagement portions constitutes a portion of said cylindrical part and a portion of said flange between a pair of said pockets and between a pair of press-cut slits formed in said annular retainer so as to extend radially outwardly from said pair of pockets, respectively, and through said flange to a radial outside of said annular retainer; and wherein each of said outer ring-engagement portions has an outer radius larger than that of a portion of said flange other than said engagement portions.

2. A one-way clutch as recited in claim 1, wherein said at least one pair of outer ring-engagement portions comprises two of said outer ring-engagement portions circumferentially spaced from one another by 180 degrees.

3. A one-way clutch as recited in claim 1, wherein said at least one pair of outer ring-engagement portions comprises two pair of said outer ring-engagement portions, said outer ring engagement portions being circumferentially spaced apart at 90 degree intervals.

* * * * *